United States Patent [19]

Enke

[11] Patent Number: 5,783,136
[45] Date of Patent: Jul. 21, 1998

[54] METHOD OF PREPARING A STEREOLITHOGRAPHICALLY PRODUCED PROTOTYPE FOR EXPERIMENTAL STRESS ANALYSIS

[75] Inventor: Neal Floyd Enke, Tecumseh, Mich.

[73] Assignee: Ford Global Technologies, Inc., Dearborn, Mich.

[21] Appl. No.: 711,144

[22] Filed: Sep. 9, 1996

[51] Int. Cl.$^6$ .............................. B29C 35/08; B29C 41/02
[52] U.S. Cl. ...................... 264/401; 264/40.1; 264/232; 264/233; 264/236; 264/308; 264/494
[58] Field of Search .................... 264/40.1, 232, 264/233, 236, 308, 401, 494

[56] References Cited

U.S. PATENT DOCUMENTS

| | | | |
|---|---|---|---|
| 5,076,974 | 12/1991 | Modrek et al. | 264/401 |
| 5,104,592 | 4/1992 | Hull et al. | 264/401 |
| 5,256,340 | 10/1993 | Allison et al. | 264/401 |
| 5,273,691 | 12/1993 | Hull et al. | 264/401 |
| 5,437,964 | 8/1995 | Lapin et al. | 430/280.1 |
| 5,482,659 | 1/1996 | Sauerhoefer | 264/401 |

*Primary Examiner*—Leo B. Tentoni
*Attorney, Agent, or Firm*—Joseph W. Malleck, Esq.; Roger L. May, Esq.

[57] ABSTRACT

A method of preparing a stereolithographically produced prototype for experimental stress analysis. The method includes creating a 3-D solid model prototype through a stereolithographic process. The prototype is cleaned in an alcohol bath and cured by exposing the prototype to a bath of ultraviolet light. Further, curing of the prototype is accomplished by placing the prototype in a thermal oven at an elevated temperature for a period of time. Upon removal and after cooling of the prototype, the prototype can be tested using several different experimental stress analysis procedures.

10 Claims, 1 Drawing Sheet

METHOD OF PREPARING A STEREOLITHOGRAPHICALLY PRODUCED PROTOTYPE FOR EXPERIMENTAL STRESS ANALYSIS

BACKGROUND OF THE INVENTION

1. Field of the Invention

The present invention relates generally to stereolithographically produced prototypes and the use of experimental stress analysis techniques on the prototypes and, more specifically, to a method for preparing a stereolithographically produced prototype that can be tested according to existing experimental stress analysis techniques.

2. Description of the Related Art

Stereolithography is a known system for producing three dimensional objects of complex geometries. Basically, stereolithography incorporates the presence of an ultraviolet laser which generates a small intense spot of ultraviolet light on a photopolymer. As the light strikes the photopolymer it causes the photopolymer to solidify. The ultraviolet laser is controlled by a computer and programmed to move in a precise manner in a particular pattern, to form a cross-section of the prototype on the photopolymer surface. After the pattern is completed, the computer lowers a plate supporting the hardened photopolymer an incremental distance and the process is repeated to form a new layer on top of the previous layer. The layers are stacked on and attached to one another to form a complex geometry prototype. Once the process is completed the prototype is removed, cleaned and post cured in an ultraviolet oven to ensure solidification of the prototype. A prototype formed according to the above-identified process is typically used to form a mold from which a casting, made from a secondary material such as a polyurethane, metal or a photoelastic material, may be made.

Experimental stress analysis procedures are known for use on rapid prototypes; i.e., those castings made from a stereolithographic prototype. Two types of experimental stress analysis procedures used today include photoelasticity and thermoelastic stress analysis. Photoelasticity is based on the phenomenon of temporary birefringence; i.e., the ability of certain materials to exhibit optically anisotropic behavior when stressed while exhibiting optically isotropic behavior when free of stress.

Thermoelastic stress analysis is based on a thermoelastic effect; i.e., a solid material subject to a sudden change in stress below its elastic limit exhibits a slight temperature change. The temperature change may be monitored, typically through the use of specially modified infrared cameras that monitor discrete temperature changes. The temperature changes are fed into appropriate signal conditioning equipment and result in a full field map of the stress patterns on the surface of the prototype.

Experimental stress analysis techniques such as those set forth above are useful with prototypes cast from either a photoelastic material, a polyurethane or a metal prototype. However, each of the prototypes must be made from a mold constructed from a stereolithographically produced prototype. It should be apparent that conventional techniques require a secondary operation; i.e., the stereolithographic prototype is not used for stress analysis testing. Instead, the stereolithographic prototype is used to make a mold from which castings, made from other materials, can be made and tested. Previously, stereolithographically produced prototypes were not used for experimental stress analysis as they exhibit different material properties in the build direction compared to the transverse direction. Stereolithographically produced prototypes are built in two dimensional (2-D) sliced layers. A process which results in different material properties in the build direction compared to the transverse direction, in essence they are anisotropic. Thus, conventional techniques require that a casting of an isotropic material be made in order to obtain a valid stress analysis.

SUMMARY OF THE INVENTION

Accordingly, the present invention is a method for preparing a stereolithographically produced prototype for use with experimental stress analysis procedures. The method includes the steps of creating a prototype through a stereolithographic process. The method also includes the steps of removing any excess resin or polymer material from the prototype and exposing the prototype to ultraviolet light to cure the prototype. The method also includes the steps of placing the prototype in a thermal oven and applying heat to break down the secondary bonds in the material from which the prototype is made. Upon cooling, the secondary bonds in the prototype reform resulting in a more homogeneous and isotropic prototype. Once cured, an experimental stress analysis procedure may be performed directly on the prototype.

One feature of the present invention is that the prototype may be experimentally analyzed without the need for a secondary operation, the need to construct or build a prototype out of a different material is eliminated. A further feature is that the method results in a superior quality prototype which has repeatable material properties. The prototype can be tested according to several experimental stress analysis procedures and results in a prototype which exhibits linear, elastic isotropic material behavior. Additionally, a prototype formed according to the present invention exhibits stable material response over time and is durable enough to withstand stress analysis testing.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
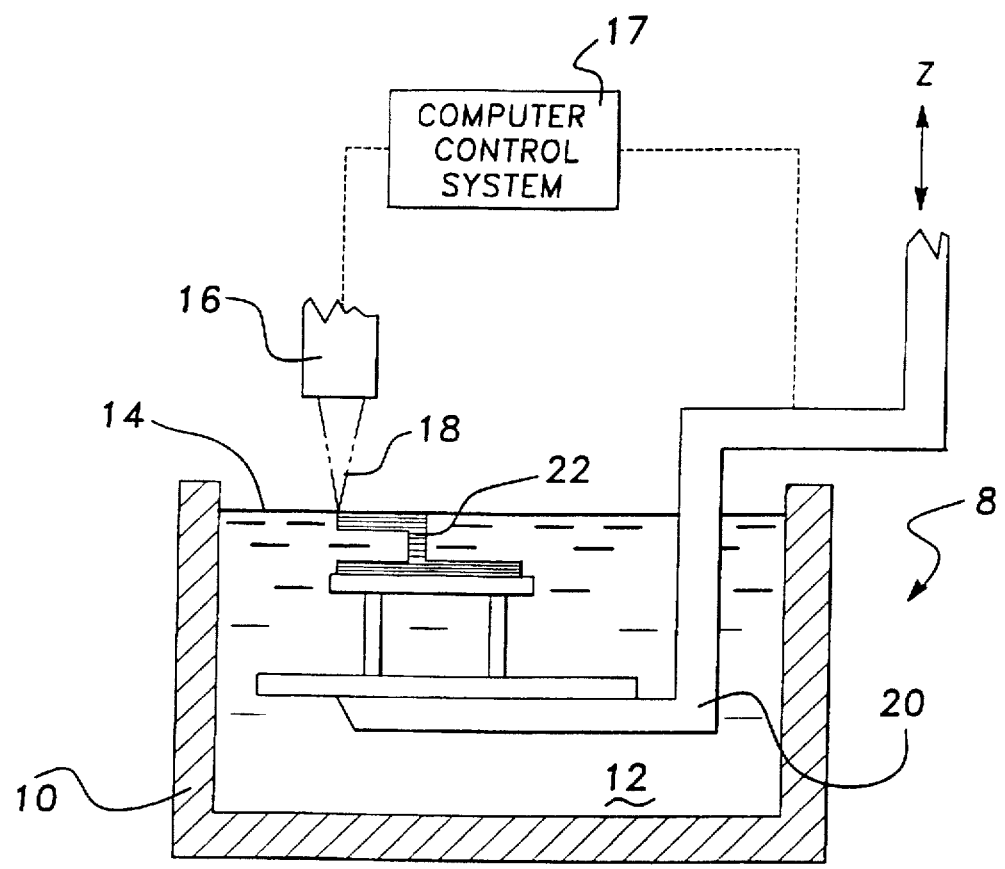
FIG. 1 is a schematic drawing of a stereolithography apparatus.
Figure 2:
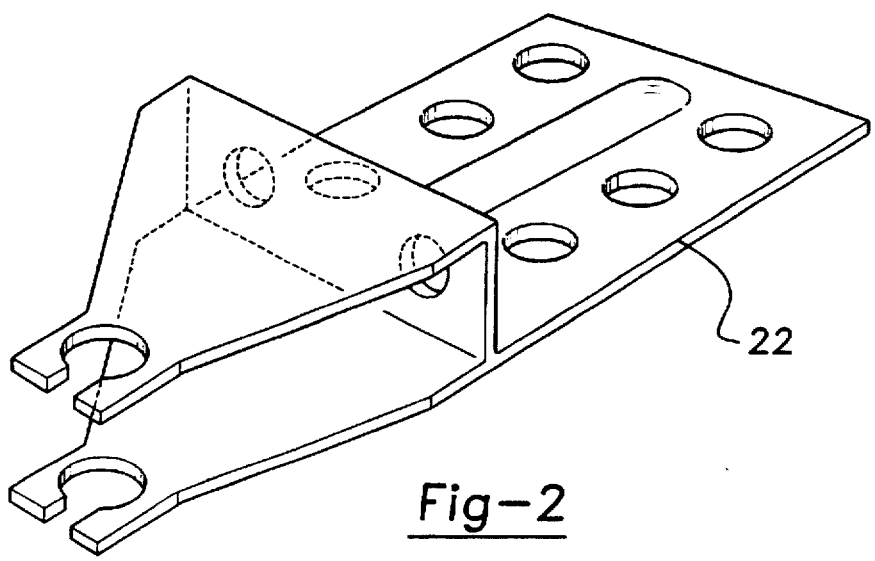
FIG. 2 is a perspective view of a three dimensional stereolithographically produced prototype from the apparatus of FIG. 1.

Referring to FIG. 1, a schematic drawing of a stereolithography apparatus 8 is shown. A container 10 is filled with an ultraviolet light (UV) curable liquid 12 providing a surface of 14. The source of ultraviolet light 16 provides a beam 18 of ultraviolet light on the surface of the UV curable liquid 12. A computer control system 17 moves the beam 18 across the surface 14 in a programmed pattern. As the beam 18 moves across the surface 14 it hardens or cures the liquid 12 providing a hardened layer. A platform 20 inside the container may be moved up and down by the computer control system 17. Thus, as each successive layer is hardened the platform 20 is moved incrementally allowing the beam 18 to form a new layer. Thus the stereolithography apparatus 8 forms a three dimensional object 22 (see FIG. 2) through a layer-by-layer build up of laminated layers. A more thorough description of a stereolithographically produced object and an apparatus for producing such an object is disclosed in U.S. Pat. No. 4,575,330.

According to the present invention, a stereolithography process is used to build a prototype out of a UV curable material. The present invention uses an ACES stereolithography system made by 3D Systems, Inc. of Valencia, Calif. to build a solid sterolithographic prototype. Additionally, the UV curable material is a photocurable epoxy resin which can be purchased from CIBA-GEIGY Corporation of Tarrytown, N.Y., under the trade name 5170.

First, a stereolithographic prototype 22 is produced by the apparatus 8. Any excess resin is drained from the prototype 22, typically by setting the prototype 22 on a drain pan and allowing gravity to drain excess resin. After the prototype 22 has completely drained, the prototype 22 is cleaned to remove any excess resin. Cleaning can be accomplished in any of several methods, including wiping the prototype 22 with a solvent, such as alcohol, to remove the excess resin. The prototype 22 may also be submerged in a vat of solvent, such as isopropyl alcohol, that is agitated to facilitate the removal of any remaining traces of resin.

Once the prototype 22 is thoroughly cleaned, it is subjected to a curing process by exposing the prototype 22 to a bath of ultraviolet light for a period of approximately 1–2 hours. The curing process may be conducted in an ultraviolet oven wherein the prototype 22 may be rotated during exposure to facilitate the curing process.

After being subjected to ultraviolet curing, the prototype proceeds through a thermal cure step that includes curing the prototype 22 in a thermal oven at 250° F. for approximately twelve (12) hours. This step breaks down the secondary bonds in the resin. As the prototype 22 is cooled the bonds reform resulting in a unique combination of material having homogeneous, isotropic and repeatable material properties. Once the prototype 22 is cooled it can then be subjected to an experimental stress analysis procedure. For example, a thermoelastic stress analysis procedure in which a specially modified infrared camera monitors the temperature changes in the prototype 22 when the prototype 22 is placed under sinusoidal loading. Additionally, a photoelasticity stress analysis procedure may be performed on the prototype 22. It should be appreciated that this method provides a prototype 22 which requires no additional processing and is suitable for experimental stress analysis testing.

EXAMPLE

The present invention will now be described by way of an example which is meant to be exemplary rather than limiting. Stereolithographically produced prototypes were built using a 5170 resin and an ACES build style with build directions in three different orientations. The prototypes were rectangular beam members manufactured with the axis of build; i.e., the layers, situated in the X (width), Y (length) and Z (height) axis. In sample 1, the build layers were transverse the X-axis (width), in sample 2, the build layers were transverse the Y-axis (length) and in sample 3, the build layers were transverse the Z-axis (height). The samples were then cured in an ultraviolet oven. After being cured in the ultraviolet oven, the samples were further cured in a thermal oven at 250° F. for 12 hours. Strain gauges were then mounted on the specimens and the specimens were loaded and cycled at low load amplitudes to avoid yielding. Load versus strain plots were obtained and used to determine the elastic moduli and poisson's ratio in the various build directions. This information is summarized in the following table:

| Sample # | $E_{xx}$ (10$^6$ psi) | $E_{zz}$ (10$^6$ psi) | $V_{xy}$ | $V_{xz}$ | $V_{yz}$ |
|---|---|---|---|---|---|
| 1 |  | 0.474 | 0.393 | 0.383 |  |
|  |  | 0.464 |  |  |  |
| 2 | 0.468 |  |  |  | 0.364 |
|  | 0.425 |  |  |  | 0.406 |
| 3 |  | 0.506 | 0.389 | 0.382 |  |
|  |  | 0.509 |  |  |  |
| AVG | 0.44 | 0.49 | 0.39 | 0.38 | 0.38 |

While some difference in elastic modulus in the build direction versus the in-plane direction is apparent, this is not considered to be outside the realm of experimental error. Furthermore, the data clearly shows that poisson's ratio is not directionally dependant. The results provide further evidence that the 5170 stereolithography resin behaves in an isotropic fashion when post cured according to the procedure and method set forth above.

An advantage of the present invention is that a stereolithographically produced prototype may be used to obtain early validation of stress levels in engineering prototypes. It provides an ideal process for obtaining experimental stresses directly from a stereolithographically produced prototype without the need for additional prototyping. Finally, use of a method for preparing a stereolithographically produced prototype as set forth above reduces experimental stress analysis time from weeks and months to several days.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of preparing a stereolithographically produced prototype for experimental stress analysis comprising:

creating a prototype through a stereolithographic process from a photocurable material;

removing any excess material from the prototype;

curing the prototype by exposing it to a bath of ultraviolet light;

curing the prototype by raising the temperature of the prototype to a temperature above ambient, the temperature of the prototype being raised to the temperature necessary to break down the secondary bonds in the material such that upon cooling, the secondary bonds reform resulting in a homogeneous and isotropic material; and performing an experimental stress analysis procedure on the prototype.

2. A method as set forth in claim 1 wherein said step of removing the excess material includes placing the prototype in an alcohol bath to remove any uncured material from the prototype.

3. A method as set forth in claim 1 wherein said step of removing any excess material includes placing the prototype on a drain pan and allowing gravity to drain any excess material.

4. A method as set forth in claim 2 wherein the alcohol bath is an isopropyl alcohol bath and further including the step of agitating the isopropyl alcohol to facilitate removal of excess material.

5. A method as set forth in claim 1 wherein said step of curing the prototype in a bath of ultraviolet light includes subjecting the prototype to the bath of ultraviolet light for a time period between 1 and 2 hours.

6. A method as set forth in claim 1 wherein said step of raising the temperature of the prototype includes raising the temperature to a temperature of 250° F.

7. A method as set forth in claim 1 including the step of slowly raising the temperature of the prototype from ambient temperature to 250° F., holding the temperature of the prototype at 250° F. for a period of 12 hours, and slowly reducing the temperature of the prototype to ambient temperature.

8. A method of preparing a stereolithographically produced prototype for experimental stress analysis comprising:

creating a prototype through a stereolithographic process utilizing a photocurable resin material and build process that results in a solid prototype;

removing any excess resin material from the prototype using an alcohol bath;

curing the prototype in an ultraviolet light oven by exposing the prototype to ultraviolet light for a period of time between 1 and 2 hours; and curing the prototype by raising the temperature of the prototype in a thermal oven to a temperature of 250° F. and holding the prototype at said temperature for a period of approximately 12 hours to break down the secondary bonds in said material such that when said prototype is cooled, the secondary bonds reform to form a homogeneous and isotropic prototype.

9. A method as set forth in claim 8 wherein said step of curing the prototype in a thermal oven includes placing the prototype in the thermal oven at ambient temperature, raising the temperature in the thermal oven to 250° F., holding the temperature in the thermal oven at 250° F. for a period of 12 hours, reducing the temperature in the oven to ambient, and removing the prototype from the thermal oven.

10. A method as set forth in claim 8 including the step of performing an experimental stress analysis procedure on the prototype.

* * * * *